Nov. 19, 1940.   L. V. McCARTY   2,222,419
SOLENOID
Filed Dec. 29, 1938
Fig. 1.
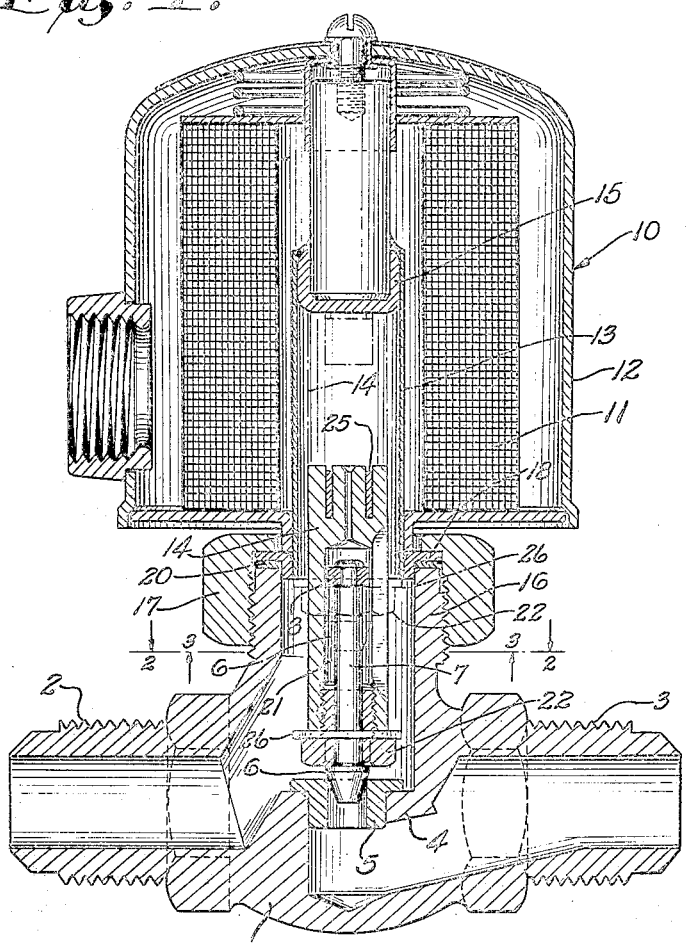
Fig. 3.
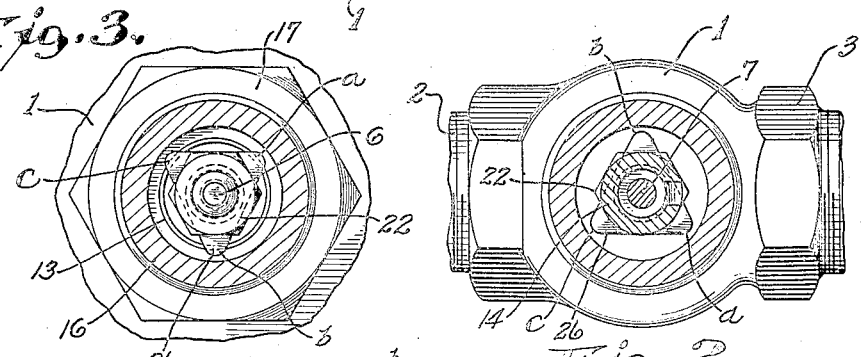
Fig. 2.
Fig. 4.
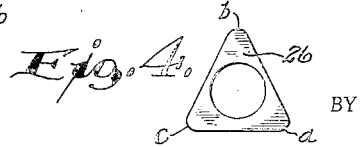
BY
INVENTOR.
Lourdes V. McCarty.
John W. Michael
ATTORNEY.

Patented Nov. 19, 1940

2,222,419

UNITED STATES PATENT OFFICE 2,222,419

SOLENOID

Lourdes V. McCarty, Milwaukee, Wis., assignor to Automatic Products Company, Milwaukee, Wis., a corporation of Wisconsin Application December 29, 1938, Serial No. 248,163

2 Claims. (Cl. 175—338)

This invention relates to an improvement in solenoids of the type which have their windings or coils energized by alternating current and which are employed for actuating or controlling valves, electric switches, or the like.

One of the objects of the invention is to provide a solenoid of this character which is so constructed and organized as to eliminate A. C. hum and render the device quiet while energized. In devices of this character it has been proposed heretofore to provide the plunger or core of the solenoid with a shading coil in its upper end to overcome the tendency of the plunger to move away from the position which it occupies when its winding is energized during the periods of zero flux. The functioning of the shading coil involves as an incident a lateral shift of the flux line which has the effect of causing or tending to cause the plunger or core of the solenoid to tilt or vibrate. This makes the operation of the device somewhat noisy and is undesirable for other reasons.

The object of the present invention is to provide a solenoid of this character which takes advantage of the desirable features of the shading coil and yet is otherwise so constructed and organized as to preclude tilting or vibration of the plunger or core when the solenoid is energized, thereby quieting the device and improving its action.

A further object of the invention is to provide a solenoid having these advantages and capacities and yet so constructed and organized as to avoid the necessity of resorting to the use of springs to move the plunger or core away from the position which it occupies when the winding of the solenoid is energized.

Another object of the invention is to provide a solenoid of this character having these advantages and which is simple and durable in its construction, reliable and effective in operation, and easy and comparatively inexpensive to manufacture.

Other objects and advantages reside in certain novel features of the construction, arrangement, and combination of parts which will be hereinafter more fully described and particularly pointed out in the appended claims, reference being had to the accompanying drawing forming a part of this specification, and in which:

Figure 1 is a view in longitudinal, central vertical section showing a solenoid valve constructed in accordance with the present invention;

Figure 2 is a detail view in horizontal cross section taken on line 2—2 of Figure 1;

Figure 3 is a detail view in horizontal cross section taken on line 3—3 of Figure 1 and looking in the direction of the arrows; and Figure 4 is a detail view in top plan of the stop plate.

In the drawing the solenoid is shown as combined with a valve to illustrate one application of the device. The valve has a casing 1 provided with an inlet 2 and an outlet 3. Internally the valve is provided with a ported partition 4 equipped with a valve seat 5, the ported partition and the valve seat being interposed between the inlet and outlet in the usual way. A valve 6 is cooperable with the valve seat 5 and has an upwardly extending stem 7 provided with a head or collar 8 fixed to the upper end of the stem.

The solenoid which controls the action of the valve 6 is designated generally at 10 and is for the most part of any standard or conventional or suitable construction. It comprises generally, a winding 11 disposed within a suitable casing 12 and surrounding a tube 13 of non-magnetic material. A plunger or core of the solenoid is designated generally at 14 and is disposed in the tube 13 and is freely shiftable therein. The upper end of the tube 13 is closed by a closure of magnetic material which, in the present instance, is shown as a tube seal cap 15 soldered or otherwise secured in place. The construction at the upper end of the tube may be varied although it is essential to close it with a closure of magnetic material. The lower end of the tube 13 is open and is alined with the upper open end of the bonnet 16 of the valve casing. The casing of the solenoid, and in fact the entire solenoid assembly except the plunger or core, is fastened to the bonnet 16 of the valve by means of a flanged nut 17 threaded to the bonnet and having its flange overlapping an annular stop 18 of angular cross section. The stop 18 is sweated or otherwise suitably fixed to the lower end of the tube 13. Interposed between the horizontal portion of the stop 18 and the upper end of the bonnet and the valve is a suitable gasket 20.

The core 14 of the solenoid is provided with an axial bore or opening 21 which extends down through the lower end of the core and terminates adjacent the top portion thereof. The stem 7 of the valve 6 extends into this opening and its head 8 is freely slidable therein. A nut 22 loosely encircles the stem 7 and is threadedly connected with the lower end of the opening 21 of the plunger or core of the solenoid. This provides for lost motion connection between the core of the solenoid and the valve so that when the winding of the solenoid is energized the plunger will be pulled up and gain momentum and open the valve under the influence of impact.

In this construction the upper end of the valve plunger is provided with a shading coil 25 which functions in the usual way to prevent the valve from dropping in the period of zero flux. In order to preclude the valve from vibrating or tilting as a result of the shifting of the flux lines caused by the functioning of the shading coil the present invention proposes the provision of a stop plate 26 which coacts with the stop 18 when the valve is in its open or energized position. The stop plate 26 may be of any suitable shape or form but preferably is triangular as shown in Figure 2 in order to have a three point contact, as at points a, b, and c. The stop plate 26 is provided with a central opening through which the tubular portion of the nut 22 extends. When the nut is tightened up its head or flange clamps the stop plate 26 firmly in position against the lower end of the plunger or core.

With this construction, when the winding is energized the core is pulled up in the tube 13 and after it has gained momentum the nut 22 engages the head 8 and opens the valve. The arrangement is such in the present instance that the magnetic flux set up by the winding 11 tends to pull the core up into engagement with the closure or cap 15, but before this can happen the stop 26 engages the stop 18 so that there is an air gap between the upper end of the core and the member 15. The stop 26, as pointed out, has a three point engagement with the stop 18 and these points of engagement are located outside of or radially beyond the lateral confines of the line of pull of the magnetic flux on the core. In this way the action of the valve is steadied so as to avoid tilting or vibration thereof.

The construction has a further distinct advantage of eliminating the sticking of the valve due to the action of residual magnetism. To secure this action, one or the other or both of the stops 26 or 18 must be of non-magnetic material and the parts must be so proportioned that these stops engage while the upper end of the core is still so spaced from the magnetic member 15 as to provide the proper air gap between the core and member 15.

While I have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claims.

The invention claimed is:

1. An alternating current electromagnet of the character described comprising an open ended tube of non-magnetic material, an electromagnetic winding surrounding the tube, a closure member of magnetic material for the upper end of the tube, a core axially shiftable in the tube through the lower open end thereof and movable upwardly within the tube under the influence of the magnetic flux when said winding is excited, said core being biased under the influence of gravity to shift axially downwardly through the open end of the tube, a shading coil carried by the upper end of the core, stop means for limiting the upward movement of the core and including a fixed stop member and a stop member carried by said core, said stop members engageable when the core is pulled upwardly within the tube, at least one of said stop members being of non-magnetic material, said stop members including an annular stop shoulder surrounding the lower end of the tube and a stop plate shaped to contact the stop shoulder at three circumferentially spaced points only, when the stop members are engaged, said plate and shoulder being cooperatively disposed with respect to the core and tube so that the upper end of the core is spaced from the magnetic closure member when said stop members are engaged.

2. An alternating current electromagnet of the character described comprising an open ended tube of non-magnetic material, an electromagnetic winding surrounding the tube, a closure member of magnetic material for the upper end of the tube, a core axially shiftable in the tube through the lower open end thereof and movable upwardly within the tube under the influence of the magnetic flux when said winding is excited, said core being biased under the influence of gravity to shift axially downwardly through the open end of the tube, a shading coil carried by the upper end of the core, stop means for limiting the upward movement of the core and including a fixed stop member and a stop member carried by said core, said stop members engageable when the core is pulled upwardly within the tube, at least one of said stop members being of non-magnetic material, one of said stop members comprising a triangular plate, the apices of which contact the other stop member at points disposed radially outwardly beyond the tube when said stop members are engaged, said stop members being cooperatively disposed with respect to the core and tube so that the upper end of the core is spaced from the magnetic closure member when said stop members are engaged.

LOURDES V. McCARTY.